A. ZIMMERMAN.
VALVE FOR WATER CLOSET TANKS.
APPLICATION FILED FEB. 5, 1906.
1,032,038.
Patented July 9, 1912.
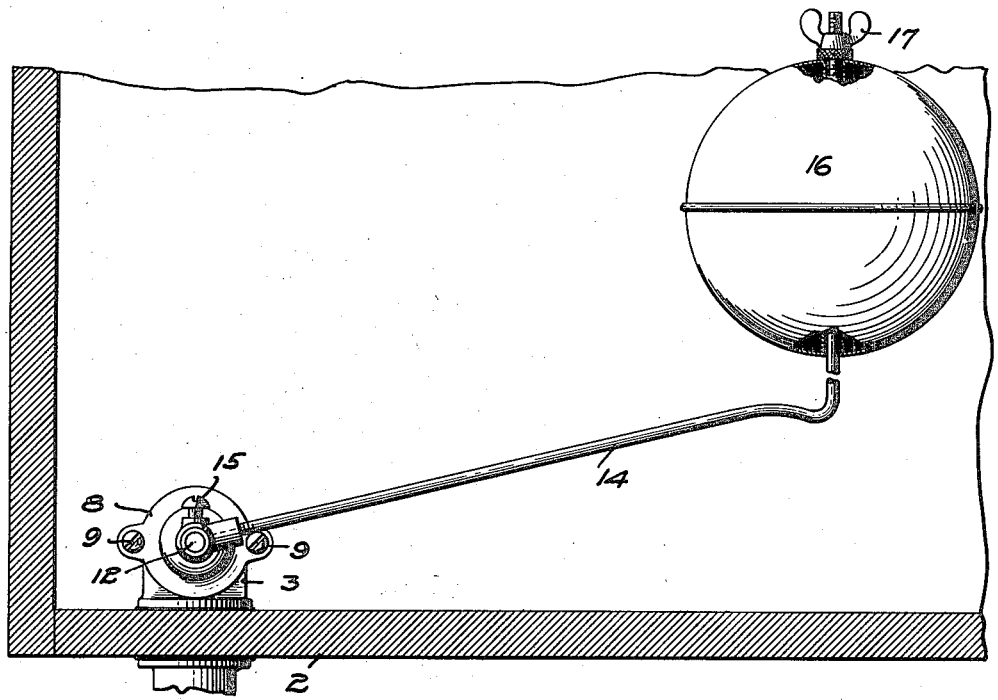
FIG. 1.
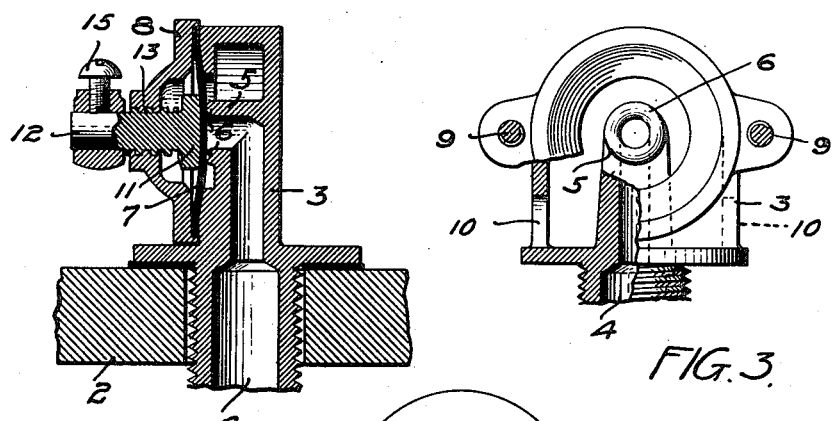
FIG. 4.
FIG. 3.
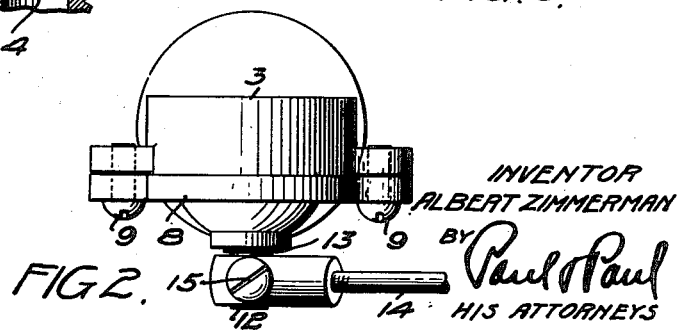
FIG. 2.
WITNESSES
M. M⸺
C. Macnamara
INVENTOR
ALBERT ZIMMERMAN
BY Paul & Paul
HIS ATTORNEYS

UNITED STATES PATENT OFFICE.

ALBERT ZIMMERMAN, OF MINNEAPOLIS, MINNESOTA.

VALVE FOR WATER-CLOSET TANKS.

1,032,038.  Specification of Letters Patent.  Patented July 9, 1912.

Application filed February 5, 1906. Serial No. 299,571.

*To all whom it may concern:*

Be it known that I, ALBERT ZIMMERMAN, of Minneapolis, Hennepin county, Minnesota, have invented certain new and useful Improvements in Valves for Water-Closet Tanks, of which the following is a specification.

The object of my invention is to provide a quick opening and closing valve, and one that will be positive and reliable in its action.

A further object is to provide a valve in which the hissing sound incident to the closing of a valve of this type is entirely eliminated.

The invention consists, generally, in providing a float which has a vertical limited movement independent of the movement of the valve.

Further, the invention consists in providing a diaphragm in connection with the valve, and means for seating the same on a valve seat through the operation of the float.

Further, the invention consists in various constructions and combinations, all as hereinafter described and particularly pointed out in the claims.

In the accompanying drawings forming part of this specification, Figure 1 is a vertical sectional view of a water closet tank with my invention applied thereto. Fig. 2 is a top view of the valve showing the manner of connecting the float lever thereon. Fig. 3 is an elevation of the valve showing the discharge openings leading to the interior of the tank. Fig. 4 is a vertical sectional view showing the interior construction.

In the drawing, 2 represents the tank and 3 a valve casing mounted thereon, and having a water intake port or passage 4. At the discharge end of this intake passage the valve casing is provided with an annular flange 5 preferebly formed integrally therewith, and having a rounded seat 6. A diaphragm 7, of rubber or other suitable material, has its edges secured between the walls of the casing 3, and a cap 8 secured to said casing by any suitable means as screws
9. The diaphragm 7 has a limited movement and in position is adapted to bear on the rounded seat 6 of the flange 5. In its other position the diaphragm is separated from the said seat, and the water is allowed to flow into the casing through the passage 4 and be discharged into the tank through ports 10 provided in said valve casing. To hold the diaphragm to its seat and prevent the entrance of water to the tank, I provide a plunger device consisting of a head 11 adapted to contact with the diaphragm, and having a stem 12 which projects through the cap 8, and has a threaded portion 13 to engage corresponding threads in said cap. The rotation of the stem 12 will have the effect of moving the head 11 toward or from the diaphragm and either engaging the diaphragm and forcing it against the valve seat or closing the same and allowing the pressure of the water to unseat the diaphragm and enter the tank. The screw motion of the plunger renders the device very powerful in its action, and insures the seating of the diaphragm and the shutting off of the water, even though the pressure may be variable and frequently abnormally high as during a fire. It often happens when the pressure is extremely high that the ordinary means for closing the valve will be insufficent to perform the operation successfully and satisfactorily. This rotating movement, however, of the plunger will entirely obviate the difficulties sometimes experienced in the operation of a valve of this type.

The float lever 14 is secured on the end of the stem 12 by a set screw 15, or any other suitable means, and said lever has an upwardly turned substantially vertical end whereon a float 16, of any suitable material, is mounted. The vertical portion of the lever is of greater length than the diameter of the float, and the float is arranged to slide freely thereon being limited in its downward movement by the angle in the lever, and in its opposite movement by the thumb nut 17 adjustable thereon on the end of the lever, and by means of which the travel of the float independent of the lever movement can be controlled.

When the tank is being emptied and the float settles therein it will move a considerable distance before the valve is opened; or in other words, a considerable portion of the water in the tank will be discharged before the inlet valve is opened to admit a fresh supply, and instead of the inlet valve opening slowly and gradually as the float settles in the tank, it will, when the float has reached the downward limit of its independent movement, be operated very quickly and allow the water to rush into the tank, a slight rotation of the plunger being sufficient to release the diaphragm and permit the pressure of the water to unseat it and open the passage. As the tank fills with water the float will gradually rise therein, but the valve will remain wide open until the float has reached the limit of its upward independent movement, when the lever will be operated to rotate the plunger and seat the diaphragm. Instead, therefore, of the valve closing slowly as the float ascends and producing the hissing sound incident to the operation of valves of this kind, the valve will remain wide open until the tank is nearly full of water, when it will be operated very rapidly to seat the diaphragm and close the supply passage. The movement of the valve can be accurately timed by means of the adjustment on the end of the float lever.

I claim as my invention:

1. In a water closet tank, the combination of a valve casing comprising a part having a water inlet passage extending up into the casing and formed on one side with a discharge opening, said casing having a portion around and spaced from said part to form a chamber around it and having ports opening laterally into the tank at the lower portion of the casing below the discharge mouth of the inlet passage, a valve seat at the discharge mouth of the inlet passage, a diaphragm arranged to engage said seat and close said passage, a cap on the side of the casing facing the discharge opening of the water passage and securing said diaphragm in place, a float lever and float, and a rotatable plunger controlled by the movement of said lever and float for seating said diaphragm, substantially as described.

2. In a water closet tank, the combination with the valve casing having a water inlet opening, and ports leading laterally into said tank below the discharge mouth of said inlet opening, of a diaphragm arranged to engage the discharge mouth and close said passage, a cap arranged opposite said diaphragm and holding the latter in position, a rotatable and reciprocating plunger arranged to engage said diaphragm and force it against said seat, said plunger having a threaded stem engaging a threaded passage in said cap, and means for automatically rotating said plunger, said means comprising a float lever mounted on said stem, and a float carried by said lever, said float having a limited movement on said lever and acting through said lever to rotate said plunger to control said diaphragm after a preliminary independent movement of the float, substantially as described.

In witness whereof, I have hereunto set my hand this 29th day of January 1906.

ALBERT ZIMMERMAN.

Witnesses:
RICHARD PAUL,
C. MACNAMARA.